(12) United States Patent
Shin

(10) Patent No.: US 11,689,077 B2
(45) Date of Patent: Jun. 27, 2023

(54) HAPTIC GENERATOR DEVICE AND APPLIED APPARATUS INCLUDING THE SAME

(71) Applicant: Seong Ho Shin, Gyeonggi-do (KR)

(72) Inventor: Seong Ho Shin, Gyeonggi-do (KR)

( * ) Notice: Subject to any disclaimer, the term of this patent is extended or adjusted under 35 U.S.C. 154(b) by 0 days.

(21) Appl. No.: 17/255,552

(22) PCT Filed: Sep. 11, 2020

(86) PCT No.: PCT/KR2020/012306
§ 371 (c)(1),
(2) Date: Dec. 23, 2020

(87) PCT Pub. No.: WO2021/075731
PCT Pub. Date: Apr. 22, 2021

(65) Prior Publication Data
US 2022/0255399 A1 Aug. 11, 2022

(30) Foreign Application Priority Data

Oct. 14, 2019 (KR) .......................... 10-2019-0127340
Feb. 18, 2020 (KR) .......................... 10-2020-0019604

(51) Int. Cl.
*H02K 7/06* (2006.01)
*G06F 3/01* (2006.01)

(52) U.S. Cl.
CPC ................................... *H02K 7/063* (2013.01)

(58) Field of Classification Search
CPC ........ H02K 7/063; H02K 7/061; H02K 7/065; H02K 7/075; H02K 1/34; H02K 33/16; H02K 35/02; A63F 13/285

(Continued)

(56) References Cited

U.S. PATENT DOCUMENTS

2015/0236576 A1* 8/2015 Shin ...................... A63F 13/285
340/407.1
2015/0288248 A1* 10/2015 Yamaguchi .......... H02K 1/2795
310/81

(Continued)

FOREIGN PATENT DOCUMENTS

JP 2015527030 A 9/2015
JP 201834084 A 9/2019

(Continued)

OTHER PUBLICATIONS

First Office Action from related Korean Appln. No 10-2020-0019604, dated Apr. 19, 2020. English machine translation attached.

(Continued)

*Primary Examiner* — Michael Andrews
(74) *Attorney, Agent, or Firm* — Grossman, Tucker, Perreault & Pfleger, PLLC

(57) ABSTRACT

A haptic generator device according to an embodiment of the present disclosure can include a stator, a rotor, a magnet, and a coil. The stator can include a stopper. The rotor can rotate in relation to the stator and can have a protrusion. The magnet can be provided on one of the rotor and the stator, where multiple magnets can be provided. The coil can be provided on the other of the rotor and the stator and can interact with the magnet to generate a rotational force. The rotor can perform an oscillating rotational movement within a 360-degree range. While the rotor is rotating in a first direction, a rotational movement of the rotor can be forcibly halted or can be rotated in a second direction opposite to the first direction to generate a rotational inertia vibration before the protrusion of the rotor collides with the stopper of the stator.

12 Claims, 17 Drawing Sheets

(58) Field of Classification Search
USPC .................................................. 310/81, 80
See application file for complete search history.

(56) References Cited

U.S. PATENT DOCUMENTS

2018/0059794 A1* 3/2018 Nakamura ............. H02K 33/02
2019/0312483 A1* 10/2019 Lee ......................... H02K 1/14

FOREIGN PATENT DOCUMENTS

| KR | 20100091881 A | 8/2010 |
| KR | 20100126154 A | 12/2010 |
| KR | 1020100126154 A | 12/2010 |
| KR | 1020130133693 A | 12/2013 |
| KR | 20150123489 A | 11/2015 |
| KR | 1020150123489 A | 11/2015 |
| KR | 101684304 B1 | 12/2016 |

OTHER PUBLICATIONS

Second Office Action from related Korean Appln. No 10-2020-0019604, dated Aug. 7, 2020. English machine translation attached.
Office Action from related Korean Appln. No 10-2014-0049833, dated Apr. 25, 2014. English machine translation attached.
Office Action from related Korean Appln. No 10-2009-0094015, dated Oct. 1, 2009. English machine translation attached.
Notice of Allowance from Korean Application No. 10-2020-0019604, dated Oct. 13, 2020. English machine translation attached.
Office Action from related Korean Appln. No. 10-2020-0019604, dated Apr. 20, 2020. English translation attached.
Office Action from related Japanese Appln. No. 2020-568543, dated Feb. 8, 2022. English translation attached.

* cited by examiner

HAPTIC GENERATOR DEVICE AND APPLIED APPARATUS INCLUDING THE SAME

CROSS-REFERENCE TO RELATED APPLICATIONS

This application is a National Phase Application of PCT International Application No. PCT/KR2020/012306, which was filed on Sep. 11, 2020, and which claims priority from Korean Patent Application No. 10-2019-0127340, filed on Oct. 14, 2019, and Korean Patent Application No. 10-2020-0019604, filed on Feb. 18, 2020. The disclosures of the above patent applications are incorporated herein by reference in their entirety.

BACKGROUND

1. Technical Field

The present disclosure relates to a haptic generator device and an applied apparatus including the same, more particularly to a haptic generator device and an applied apparatus including the same for generating rotational inertia vibration and impact vibration.

2. Description of the Related Art

Devices for generating vibration are embedded in mobile phones as an alternative to ring tones in indicating an incoming call or message or embedded in gaming controllers to add reality to the game and increase fun and enjoyment for the user. Also, with advances in technology, the functions of mobile phones have expanded beyond mere communication to multimedia replay and exchange, Internet access, gaming, etc.; the functions of gaming consoles have expanded to Internet access and video replay; and the functions of video players have expanded to music and video replay as well as Internet access and gaming. Accordingly, the field of utility of vibrating devices is continually increasing, and such devices typically use compact vibration motors. In such a motor, adjusting the vibration generally involves adjusting the voltage to modify the number of revolutions of the motor and thus changing the intensity of the vibration.

SUMMARY

The present disclosure is to provide a haptic generator device and an applied apparatus that use a single haptic element to provide an impact vibrations and a rotational inertia vibration that provide the user with different tactile sensations.

A haptic generator device according to an embodiment of the present disclosure can include a stator part, a rotor part, a magnet, and a coil. The stator part can include a stopper. The rotor part can be configured to rotate in relation to the stator part and can have a protrusion. The magnet can be provided on one of the rotor part and the stator part, and a multiple number of magnets can be provided. The coil can be provided on the other of the rotor part and the stator part and can be configured to interact with the magnet to generate a rotational force. The rotor part can perform an oscillating rotational movement within a 360-degree range. While the rotor part is rotating in a first direction, a rotational movement of the rotor part can be forcibly halted or can be rotated in a second direction opposite to the first direction to generate a rotational inertia vibration before the protrusion of the rotor part collides with the stopper of the stator part.

The haptic generator device can be configured to generate an impact vibration different from the rotational inertia vibration. The rotation angle of the rotor part when generating the rotational inertia vibration can be smaller than the rotation angle of the rotor part when generating the impact vibration.

The haptic generator device can generate the impact vibration by having the protrusion collide with the stopper.

The frequency when generating the rotational inertia vibration can be different from the frequency when generating the impact vibration.

When the rotational inertia vibration is being generated, an operation of rotating the rotor part in a rotation direction and a braking operation can be performed while the rotor part is rotating without changing the rotation direction.

When the rotational inertia vibration is being generated, the rotational movement of the rotor part can be halted or changed to the second direction before halting at a preset time or longer after the rotor part begins the rotational movement in the first direction.

When the magnet has an m number of poles, the rotor part can rotate within the rotation angles occupied by an (m−1) number of poles to generate the rotational inertia vibration, where m is a natural number greater than or equal to 3.

The number of coils can be k times greater than the number of poles of the magnet, where k is a natural number.

An eccentric mass coupled to the rotor part can further be included.

When the rotational inertia vibration is being generated, an operation of rotating the rotor part in a first direction and a braking operation can be performed while the rotor part is rotating without changing the rotation direction.

A haptic generator device according to an embodiment of the present disclosure can include a stator part, a rotor part, a magnet, and a coil. The stator part can include a stopper. The rotor part can be configured to rotate in relation to the stator part and can have a protrusion. The magnet can be provided on one of the rotor part and the stator part, and a multiple number of magnets can be provided. The coil can be provided on the other of the rotor part and the stator part and can be configured to interact with the magnet to generate a rotational force. The rotor part can perform an oscillating rotational movement within a 360-degree range. The rotor part can be configured to generate an impact vibration and a rotational inertia vibration that are different from each other while rotating within a particular rotation angle range.

An applied apparatus according to an embodiment of the present disclosure can include a haptic element and a driving circuit. The haptic element can include a stator part, a rotor part, a magnet, and a coil. The stator part can include a stopper. The rotor part can be configured to rotate in relation to the stator part and can have a protrusion. The magnet can be provided on one of the rotor part and the stator part, and a multiple number of magnets can be provided. The coil can be provided on the other of the rotor part and the stator part and can be configured to interact with the magnet to generate a rotational force. The rotor part can perform an oscillating rotational movement within a 360-degree range. While the rotor part is rotating in a first direction, a rotational movement of the rotor part can be forcibly halted or can be rotated in a second direction opposite to the first direction to generate a rotational inertia vibration before the protrusion of the rotor part collides with the stopper of the stator part.

With a haptic generator device according to an embodiment of the present disclosure, it is possible to provide impact vibrations and rotational inertia vibrations, which provide different sensations to the user, by using a single haptic element. Thus, the user can be provided with a more varied and more realistic haptic feedback.

Also, it is possible to individually control the frequencies and intensities of the impact vibrations and rotational inertia vibrations.

Also, when a rotational inertia vibration is generated, it is possible to control the vibration type of the rotational inertia vibration through a combination of the rotation speed, braking operation, and idle duration of the rotor part.

DETAILED DESCRIPTION

Figure 1:
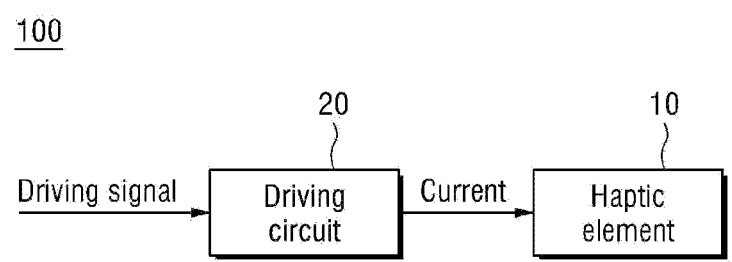
FIG. 1 is a block diagram illustrating a haptic generator device according to an embodiment of the present disclosure.

All of the embodiments described below are set forth for illustrative purposes as aids for better understanding the present disclosure and can be practiced in various forms different from the embodiments described herein. Also, in describing the present disclosure, detailed explanations of relevant functions or components that are publicly known are omitted, if it is deemed that such detailed explanations may unnecessarily obscure the essence of the present disclosure.

The appended drawings, provided to aid the understanding of the present disclosure, are not necessarily to scale but rather have certain components illustrated in an exaggerated form. In assigning reference numerals to the components, the same numerals are assigned to the same components, as much as possible, even when the components are shown in different drawings.

Also, the description of the embodiments of the present disclosure can use terms such as first, second, A, B, (a), (b), etc. Such terms are used merely to distinguish a component from another and do not limit the nature, sequence, order, etc., of the corresponding component. When a component is described as being 'connected', 'coupled', or 'joined' to another component, it should be understood that the component can be connected, coupled, or joined to the other component, but still another component can be 'connected', 'coupled', or 'joined' between the component and the other component.

Therefore, the embodiments disclosed in the specification and the compositions illustrated in the drawings merely correspond to the most preferred embodiments of the present disclosure and do not represent the entire technical spirit of the present disclosure, and as such, there can be numerous variations of the present disclosure.

A term or word used in the specification and claims must not be limited to its common or dictionary meaning but rather must be interpreted to the meaning and concept that are in agreement with the technical spirit of the present disclosure, based on the principle that the inventor may suitably define the concept of a term to describe the invention in the best way possible.

In the present application, an expression used in the singular encompasses the meaning of the plural, unless the meaning is clearly different in the context.

FIG. 1 is a block diagram illustrating a haptic generator device according to an embodiment of the present disclosure.

Referring to FIG. 1, a haptic generator device 100 can include a haptic element 10 and a driving circuit 20.

The haptic element 10 may generate a vibration by way of an electric current applied from the driving circuit 20.

The driving circuit 20 may receive a driving signal and provide the electric current to the haptic element 10.

Figure 2:
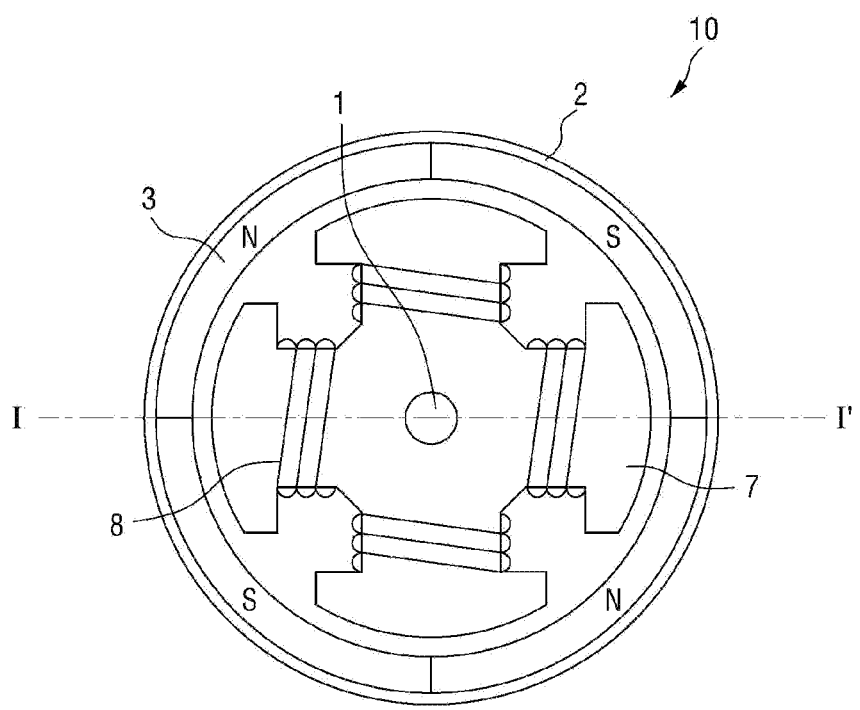
FIG. 2 is a plan view of a haptic element according to an embodiment of the present disclosure.
Figure 3:
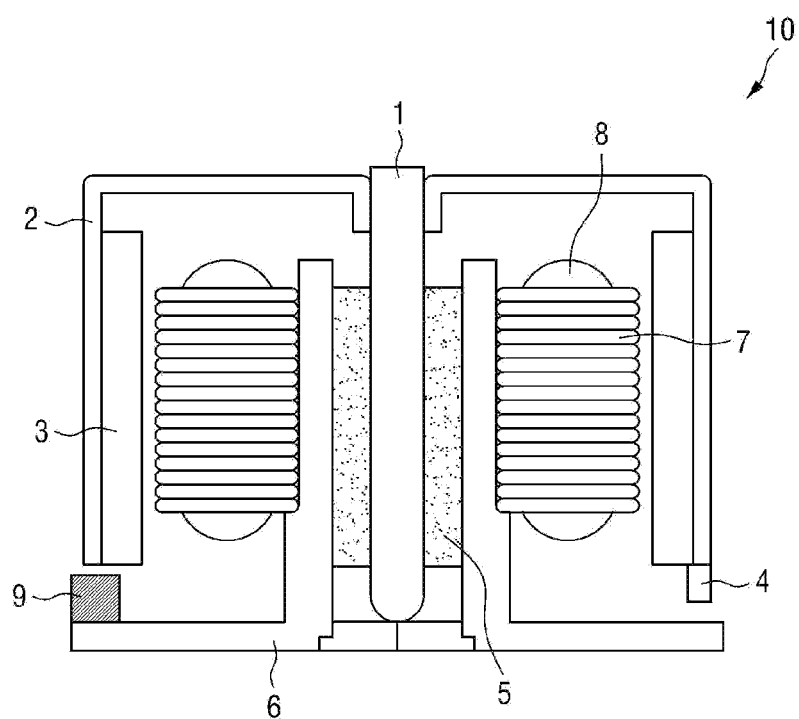
FIG. 3 is a cross-sectional view across line I-I' of FIG. 2.

FIG. 2 is a plan view of a haptic element according to an embodiment of the present disclosure, and FIG. 3 is a cross-sectional view across line I-I' of FIG. 2.

Referring to FIG. 2 and FIG. 3, the haptic element 10 may include a rotary shaft 1, a stator part, and a rotor part that rotates in relation to the stator part.

The rotary shaft 1 may be arranged at a center portion of the rotor part. The rotary shaft 1 can be rotatably coupled to the stator part.

The rotor part can be connected to the rotary shaft 1 and can rotate together when the rotary shaft 1 is rotated. The rotor part can include a rotor case 2, a magnet 3, and a protrusion 4. The rotor case 2 may provide a space within. The magnet 3 can be secured to an inner perimeter of the rotor case 2. The magnet 3 can have multiple poles. The magnet 3 can be coupled to the rotor case 2, and in an embodiment of the present disclosure, the magnet 3 can be coupled to the inner perimeter of the rotor case 2. The magnet 3 can rotate together with the rotor case 2 when the rotary shaft 1 is rotated.

The protrusion 4 can be coupled to the rotor case 2 or to the rotary shaft 1. The protrusion 4 can rotate together when the rotary shaft 1 is rotated.

The stator part can include a holder 6, winding cores 7, coils 8, and a stopper 9.

A space in which to arrange the rotary shaft 1 can be provided in a center portion of the holder 6. The rotary shaft 1 can be rotatably secured within the center portion of the holder 6.

The winding cores 7 can be coupled to the holder 6. The coils 8 can be wound around the winding cores 7. A winding core 7 can be made of a magnetic substance to increase the magnetic efficiency of the wound coil 8. However, the disclosure is not limited thus, and the winding cores 7 can be made of a non-magnetic substance or be omitted altogether for cost reduction or size reduction or can be formed integrated with the holder 6. A multiple number of winding cores 7 can be included.

The coils 8 may be arranged around the rotary shaft 1 and may be arranged to face the magnet 3. The coils 8 can be separated from the magnet 3 to generate electromagnetic forces together with the magnet 3, and the rotor part can be rotated by the electromagnetic forces.

In an embodiment of the present disclosure, the coils 8 can be wound around the winding cores 7 to improve magnetic efficiency. However, the disclosure is not limited thus, and in cases where the winding cores 7 are omitted, the coils 8 can be secured to a structure of the stator part.

The greater the number of coils 8, the smoother the rotation of the rotor part, and the easier the control of the rotational direction. When the number of coils 8 and the number of poles of the magnet 3 satisfy a particular condition, it would be easier to the control the rotor part. This will be described later in further detail.

In cases where there are a multiple number of coils 8, the winding cores 7 around which the coils 8 are wound can also be provided in a multiple number. Here, each of the coils can be connected or can be divided in such a manner that electric currents are received from a single driving circuit 20 (see FIG. 1). However, the disclosure is not limited thus, and it is possible to have each of the coils receive an electric current from a different driving circuit.

The stopper 9 may be arranged to collide with the protrusion 4 to thereby obstruct the rotation of the protrusion 4 and generate an impact when the rotor part is rotated. The stopper 9 can be coupled to the holder 6.

The stator part can further include a bearing 5. The bearing 5 can be arranged at a center portion of the holder 6 and can be secured to the holder 6. A hole can be formed within the bearing 5, and the rotary shaft 1 can be inserted into the hole of the bearing 5.

In a haptic generator device 100 according to an embodiment of the present disclosure, when the rotor part is rotated, the stopper 9 can collide with the protrusion 4 and generate an impact vibration, and therefore the rotor part can rotate to less than 360 degrees.

The above description of a haptic element 10 according to an embodiment of the present disclosure referred to the magnet 3 being included in the rotor part and the coils 8 and winding cores 7 being included in the stator part. However, the disclosure is not limited thus, and other embodiments can operate under the same principles even if the coils are included in the rotor part and the magnet is included in the stator part.

Figure 4A:
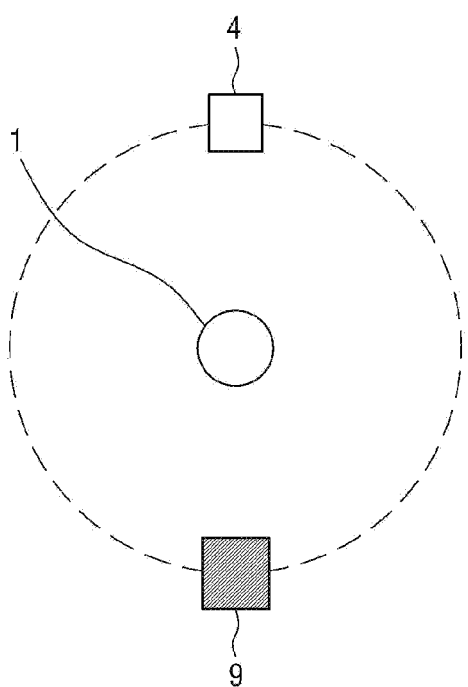
FIG. 4A, FIG. 4B, and FIG. 4C are conceptual diagrams illustrating an impact vibration of a haptic generator device.
Figure 4B:
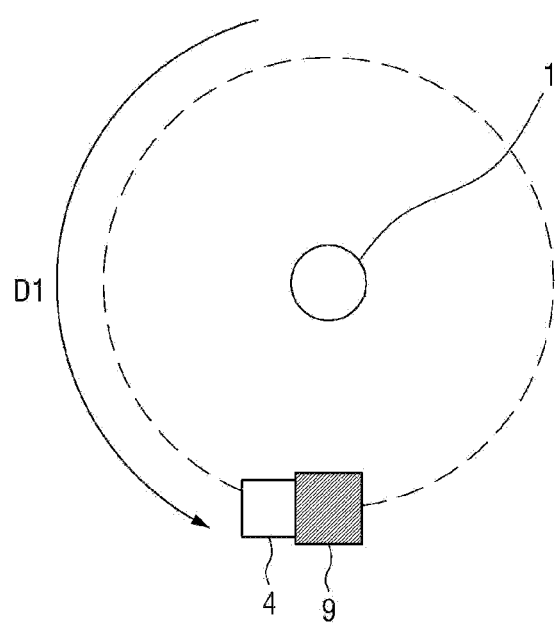
Figure 4C:
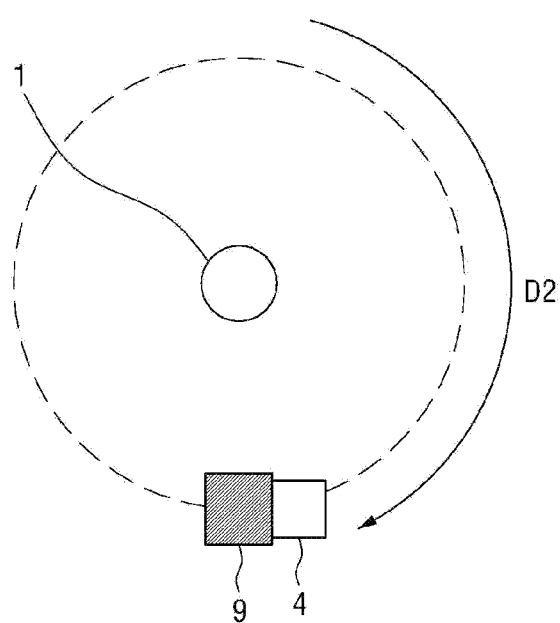

FIGS. 4A to 4C are conceptual diagrams illustrating an impact vibration of a haptic generator device.

As seen in a plan view, the protrusion 4 can rotate about the rotary shaft 1 along the rotational trajectory marked in dotted lines, to collide with the stopper 9 and generate an impact vibration.

From the state shown in FIG. 4A, if the protrusion 4 is rotated in a counterclockwise direction D1, then the protrusion 4 may collide with one side of the stopper 9, as shown in FIG. 4B. Afterwards, if the protrusion 4 is rotated in a clockwise direction D2, then the protrusion 4 may collide with the other side of the stopper 9, as shown in FIG. 4C.

Supposing the cycle of one revolution by the protrusion 4 from the position of FIG. 4B to the position of FIG. 4C has a period of T, then the frequency in which the protrusion 4 and the stopper 9 collide is the inverse of T. In cases where the rotor part to which the protrusion 4 is secured rotates at maximum speed, the inverse of T becomes the maximum frequency in which the protrusion 4 may undergo an oscillating rotational movement and generate impact vibrations.

A haptic generator device according to an embodiment of the present disclosure can express not only impact vibrations but also rotational inertia vibrations.

Figure 5A:
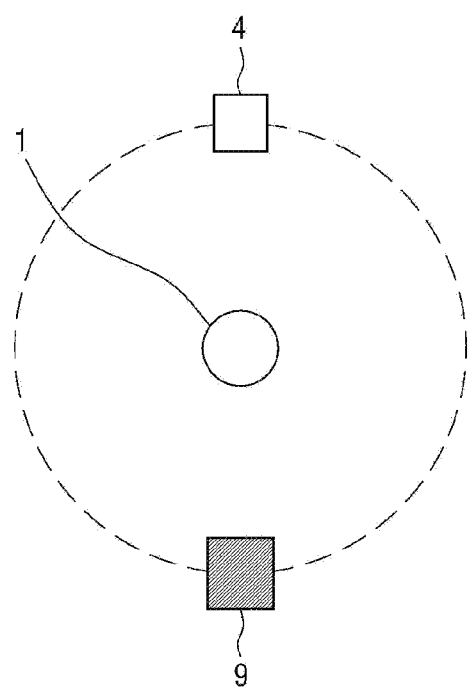
FIG. 5A, FIG. 5B, and FIG. 5C are conceptual diagrams illustrating a rotational inertia vibration of a haptic generator device.
Figure 5B:
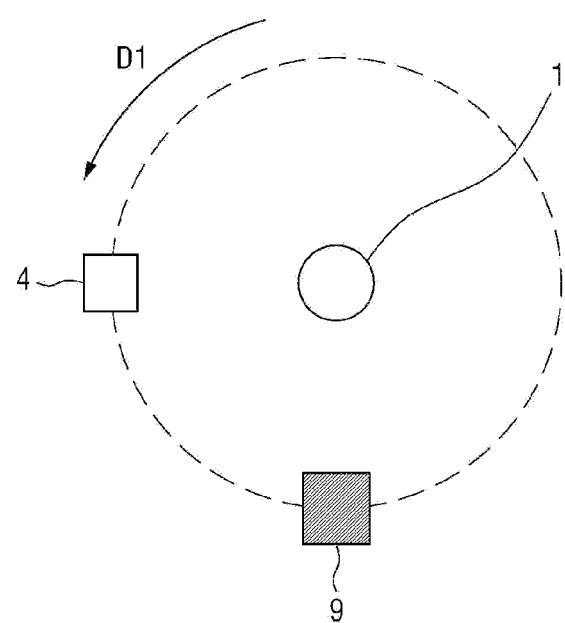
Figure 5C:
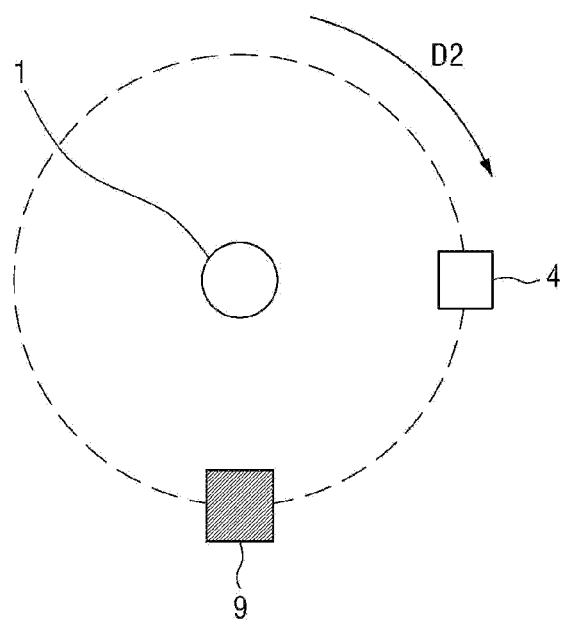

FIGS. 5A to 5C are conceptual diagrams illustrating a rotational inertia vibration of a haptic generator device and represent a plan view of the embodiment of FIG. 2.

A description of the rotational inertia vibration of the haptic generator device is provided below with reference to FIGS. 5A to 5C.

If the rotor part, during rotation in the clockwise/counterclockwise direction, changes the rotational direction to the counterclockwise/clockwise direction, then a vibration is generated due to a collision between the rotational inertia, which is the tendency to continue rotating in the original rotational direction, and the energy forcing a rotation in an opposite direction of the original rotational direction. The same is true when the rotation of the rotor part is forcibly halted. Such a vibration is defined herein as a rotational inertia vibration. A rotational inertia vibration generated by a haptic generator device 100 based on the present disclosure can be generated by the principle of action and reaction of the rotational inertia of the rotor part.

The intensity of a rotational inertia vibration is increased with an increase in the rotational energy of the rotor part undergoing the rotational movement and is proportional to the rotational speed and weight of the rotor part. The intensity is also proportional to the magnitude of energy change when the rotor part changes its rotational direction or is halted. Therefore, in cases where the rotational speed of the rotor part is gradually slowed down and stopped or gradually sped up with the rotational direction changed after being halted, the rotational inertia vibration can be small.

Supposing that the position of the protrusion 4 in FIG. 5A is the starting position, the rotor part may be rotated in the counterclockwise direction D1 as in FIG. 5B. Afterwards, before the protrusion 4 of the rotor part halts or before the protrusion collides with one side of the stopper 9, the rotation of the rotor part can be forcibly halted, or the rotor part can be reversely rotated in the clockwise direction D2 as in FIG. 5C, to generate a rotational inertia vibration.

The rotational inertia vibration generated by way of a haptic generator device 100 based on the present disclosure uses a different vibration-generating principle and provides a different effect compared to the vibration generated by the rotation of an eccentric mass in the existing ERM (eccentric rotating mass) vibration motor or the vibration generated by the linear oscillating motion of a weight connected to an elastic body in the LRA (linear resonant actuator).

Likewise, before the protrusion 4 of the rotor part rotating in the clockwise direction D2 as in FIG. 5C halts or before the protrusion collides with the other side of the stopper 9, the rotation of the rotor part can be forcibly halted, or the rotor part can be reversely rotated in the counterclockwise direction D1 as in FIG. 5B, to generate a rotational inertia vibration.

With a haptic generator device 100 according to an embodiment of the present disclosure, it is possible to provide impact vibrations and rotational inertia vibrations, which provide different sensations to the user, by using a single haptic element 10. Thus, a more varied and more realistic haptic feedback can be provided to the user.

When the haptic generator device 100 generates a rotational inertia vibration, the rotation angle of the protrusion 4 can be smaller compared to when the haptic generator device 100 generates an impact vibration.

In an embodiment of the present disclosure, the rotational inertia vibrations and the impact vibrations generated by a haptic generator device 100 can have different frequencies and different periods. Supposing that the rotational speed is constant, such as when the rotor part is rotated at maximum speed, the frequency of the rotational inertia vibrations generated by the haptic generator device 100 can be greater than the frequency of the impact vibrations. Also, the period of the rotational inertia vibrations generated by the haptic generator device 100 can be shorter than the period of the impact vibrations. Furthermore, the frequencies and periods of the rotational inertia vibrations and impact vibrations can be controlled individually.

In an embodiment of the present disclosure, the intensity and type of the rotational inertia vibration of the haptic generator device 100 can be adjusted. The intensity of the rotational inertia vibration can be controlled by the speed of the rotor part and the rotation angle of the protrusion 4. The type of rotational inertia vibration can be controlled by change in speed or the change in energy at the instant the period of oscillating rotation or the rotational direction of the rotor part is changed. A description is provided below of a more specific method of controlling a rotational inertia vibration of a haptic generator device 100.

Figure 6:
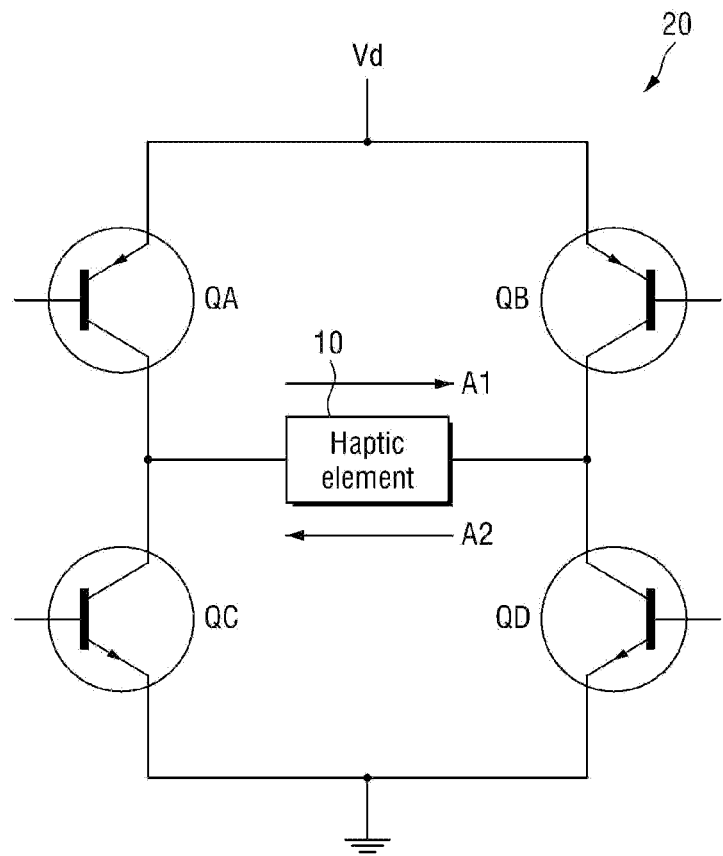
FIG. 6 is a diagram illustrating a haptic element and a driving circuit for applying a current to the haptic element.

FIG. 6 is a diagram illustrating a haptic element and a driving circuit for applying a current to the haptic element. FIG. 6 illustrates an example in which the driving circuit 20 is a bridge circuit.

Referring to FIG. 2, FIG. 3, and FIG. 6, the electric current flowing through the coils 8 of the haptic generator device 100 can be applied by the driving circuit 20. The driving circuit 20 can be provided on a circuit board, and the circuit board can be provided inside or outside a package containing the haptic element 10.

The rotational direction of the rotor part of the haptic generator device 100 can be determined by the direction of the electric current applied to the coils 8 of the haptic element 10.

The driving circuit 20 can include a first to a fourth transistor QA, QB, QC, QD, each of which is subject to on/off control by a control signal. The first transistor QA and third transistor QC may be connected in series, and the second transistor QB and fourth transistor QD may be connected in series. A node to which the first transistor QA and second transistor QB are connected may receive a power voltage Vd, while a node to which the third transistor QC and fourth transistor QD are connected may be grounded. One end of the haptic element 10 may be connected to the node to which the first transistor QA and third transistor QC are connected, and the other end of the haptic element 10 may be connected to the node to which the second transistor QB and fourth transistor QD are connected.

When the first transistor QA and fourth transistor QD are turned on and the second transistor QB and third transistor QC are turned off, an electric current may flow in the haptic generator device 100 in a first direction A1. When the second transistor QB and third transistor QC are turned on and the first transistor QA and fourth transistor QD are turned off, an electric current may flow in the haptic element 10 in a second direction A2 that is an opposite direction of the first direction A1. Through an on/off control of the first to fourth transistors QA, QB, QC, QD, it is possible to change the direction of the current flowing in the haptic element 10 and control the direction of rotation of the rotor part.

A rotational inertia vibration of the haptic generator device 100 can be generated not only by changing the rotational direction of the rotor part but also by a braking operation.

Referring to FIG. 6, while an electric current is flowing in the haptic generator device 100 in the first direction A1 or second direction A2, the third transistor QC and fourth transistor QD can be turned on, and the first transistor QA and second transistor QB can be turned off. Here, a force may be generated that hinders the rotation of the rotor part of the haptic element 10, and this can serve as a braking operation.

A description is provided below of a way to control the rotation speed of the rotor part of a haptic generator device 100.

Figure 7A:
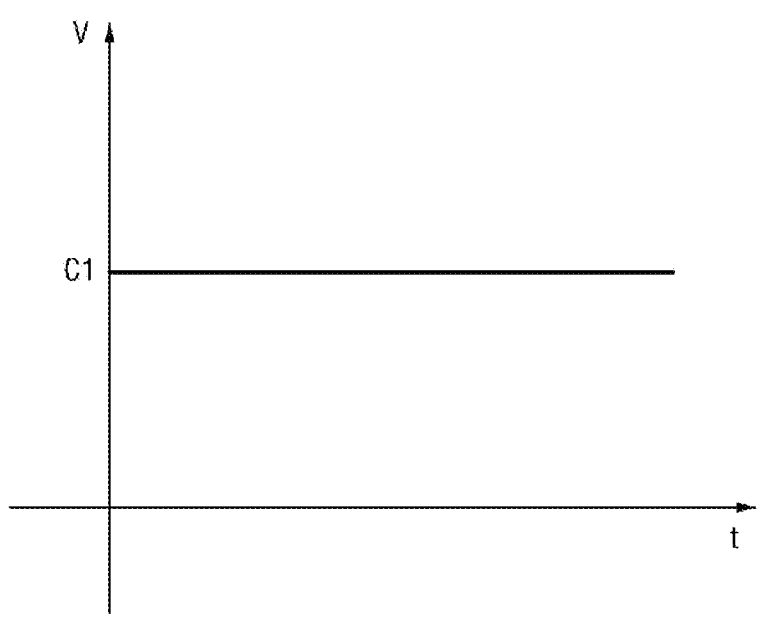
FIG. 7A and FIG. 7B are diagrams illustrating examples of control signals that may be provided to the first and fourth transistors of FIG. 6 to control the rotation speed of the rotor part.
Figure 7B:
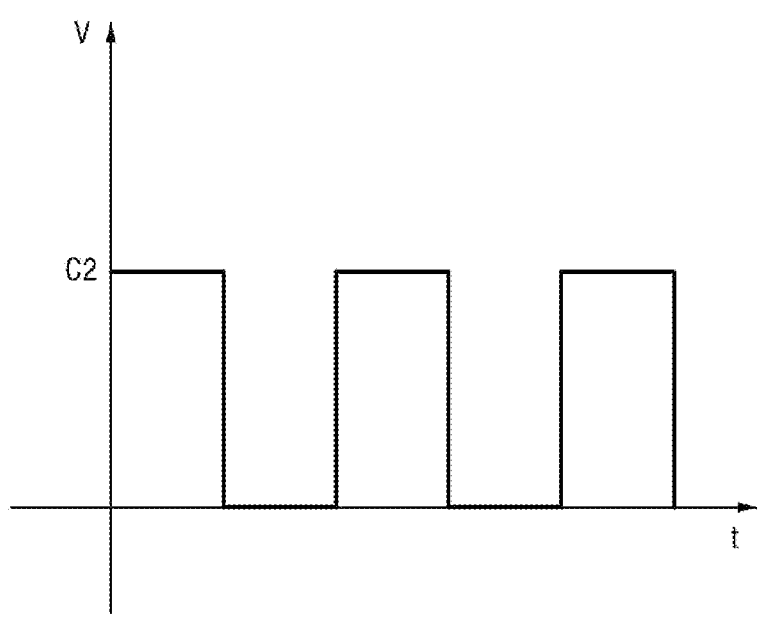

FIG. 7A and FIG. 7B are diagrams illustrating examples of control signals that may be provided to the first and fourth transistors of FIG. 6 to control the rotation speed of the rotor part.

In an embodiment of the present disclosure, the rotational speed of the rotor part can be controlled by adjusting the magnitude of the electric current flowing through the coils of the haptic generator device 100. More specifically, by controlling the on-off ratio of the control signals applied to the transistors of FIG. 6, it is possible to control the on-off ratio of the electric current and adjust the magnitude of the current.

Consider an example in which an electric current is flowing in the haptic element 10 in the first direction A1 in FIG. 6. The magnitude of the electric current flowing in the haptic element 10 when the control signal C1 of FIG. 7A is applied to the control terminal of each of the first transistor QA and the fourth transistor QD can be greater than the magnitude of the electric current flowing in the haptic element 10 when the control signal C2 of FIG. 7B is applied. By controlling the magnitude of the electric current, it is possible to control the rotation speed or the magnitude of the rotational energy.

In an embodiment of the present disclosure, the rotation speed of the rotor part can be controlled by repeating an operation of providing an electric current to the coils of the haptic element 10 in a particular direction and a braking operation while the rotor part is being rotated without changing the rotational direction. Here, as rotational inertia vibrations can be generated during a braking operation, a very high rotation frequency can be obtained even within the rotation angle range of the rotor part.

Even during the operation of providing an electric current in a particular direction to the coils of the haptic element 10, it is possible to control the on-off ratio of the control signals for the transistors as described above. Also, after a braking operation, an idle duration can additionally be included in which all of the first to fourth transistors QA, QB, QC, QD are turned off.

According to an embodiment of the present disclosure, it is possible to control the frequency and period of the rotor part and control the intensity of the rotational inertia vibrations by controlling the speed and direction of the rotor part of the haptic generator device 100.

According to an embodiment of the present disclosure, the type of vibration can be controlled depending on the rotation method, even when the average speed is kept constant during a rotation period of the rotor part of the haptic generator device 100.

For example, a first rotational inertia vibration can be defined as the rotational inertia vibration that occurs when the rotor part, after having rotated in one direction for a first duration at a first speed, rotates in the opposite direction at the first speed. Also, a second rotational inertia vibration can be defined as the rotational inertia vibration that occurs when the rotor part, after having rotated in one direction for a second duration corresponding to a half of the first duration at a second speed corresponding to a half of the first speed and then having performed a braking operation for a second duration, rotates in the opposite direction at the first speed. The first rotational inertia vibration and the second rotational inertia vibration are different types of vibration and can be perceived differently by the user. The first rotational inertia vibration would convey a stronger or more acute sensation to the user compared to the second rotational inertia vibration.

Although an example is provided above, certain embodiments of the present disclosure can use various combinations for the rotation speed, braking operation, and idle duration of the rotor part of the haptic generator device 100 to control the vibration type of the rotational inertia vibration. Such various vibration types can provide the user with realistic and interesting sensations.

In an embodiment of the present disclosure, it is also possible to determine the rotation angle by adjusting the time at which the rotation direction is changed. When the haptic generator device 100 generates a rotational inertia vibration, the time at which the rotation direction is changed can be adjusted such that the protrusion 4 does not collide with the stopper 9. Also, by adjusting the time at which to change the rotation direction, the protrusion 4 can be made to collide with the stopper 9 and generate an impact vibration.

Figure 8A:
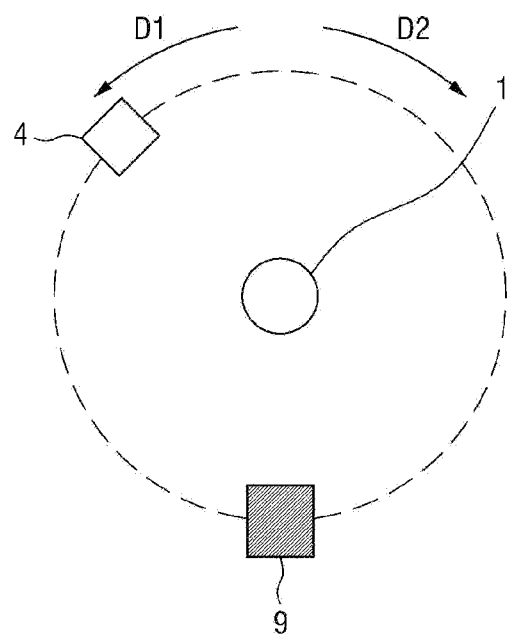
FIG. 8A, FIG. 8B, and FIG. 8C are conceptual diagrams illustrating a haptic generator device alternately generating a rotational inertia vibration and an impact vibration.
Figure 8B:
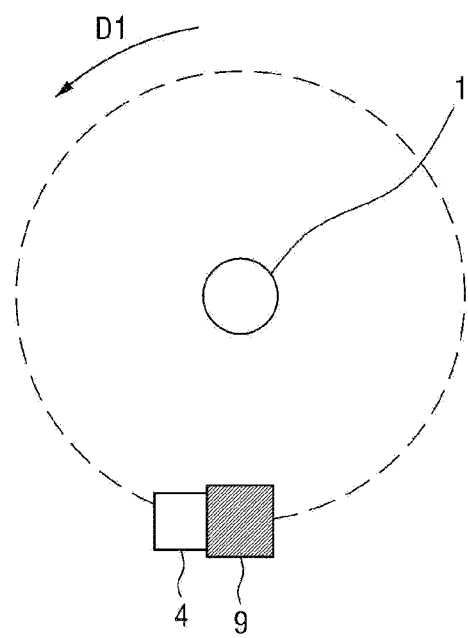
Figure 8C:
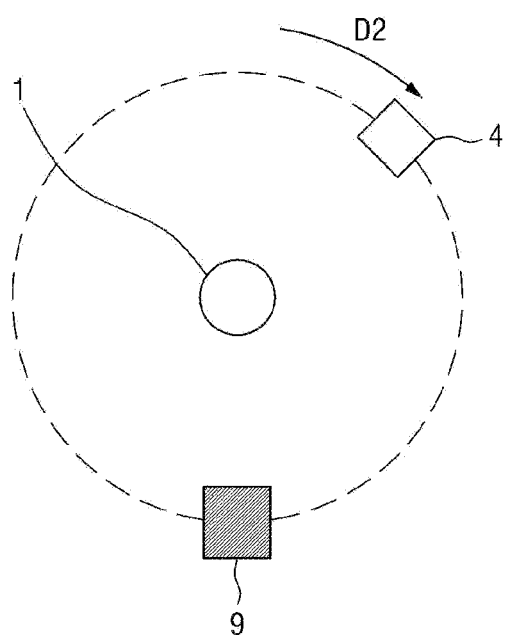

FIGS. 8A to 8C are conceptual diagrams illustrating a haptic generator device alternately generating a rotational inertia vibration and an impact vibration and represent a plan view of the embodiment of FIG. 2.

Referring to FIGS. 8A to 8C, the haptic generator device 100 can generate rotational inertia vibrations and impact vibrations alternately.

As in FIG. 8A, the protrusion 4 in a starting position may be positioned relatively closer to the stopper 9 in a particular direction and may be positioned relatively further from the stopper 9 in the opposite direction. For example, the protrusion 4 may be closer to the stopper 9 in the counterclockwise direction D1 than in the clockwise direction D2 as in FIG. 8A.

From a starting position such as that in FIG. 8A, the rotor part including the protrusion 4 can perform an oscillating movement to a particular rotation range from the starting position to generate impact vibrations and rotational inertia vibrations.

Referring to FIG. 8B, the rotor part can rotate in the counterclockwise direction D1 to collide with one side of the stopper 9 and generate an impact vibration.

Afterwards, referring to FIG. 8C, the protrusion 4 may be rotated in the clockwise direction D2. Before the protrusion 4 of the rotor part collides with the other side of the stopper 9, the rotation of the rotor part can be forcibly halted or rotated in reverse to the counterclockwise direction D1 to generate a rotational inertia vibration. Here, the impact vibration and the rotational inertia vibration can be generated with the same frequency and the same period.

The haptic generator device 100 can configure the initial position and particular rotation range of the protrusion 4 to alternately generate impact vibrations and rotation inertia vibrations. This form of vibration can be perceived by the user as a type of haptic feedback that is different from generating only impact vibrations or only rotation inertia vibrations. Thus, the haptic generator device 100 described with reference to FIGS. 8A to 8C can generate not only impact vibrations or inertia vibrations but also combinations of impact vibrations and inertia vibrations, and as a rich variety of tactile sensations based on various different combinations can be provided, the user can perceive various tactile sensations.

Figure 9:
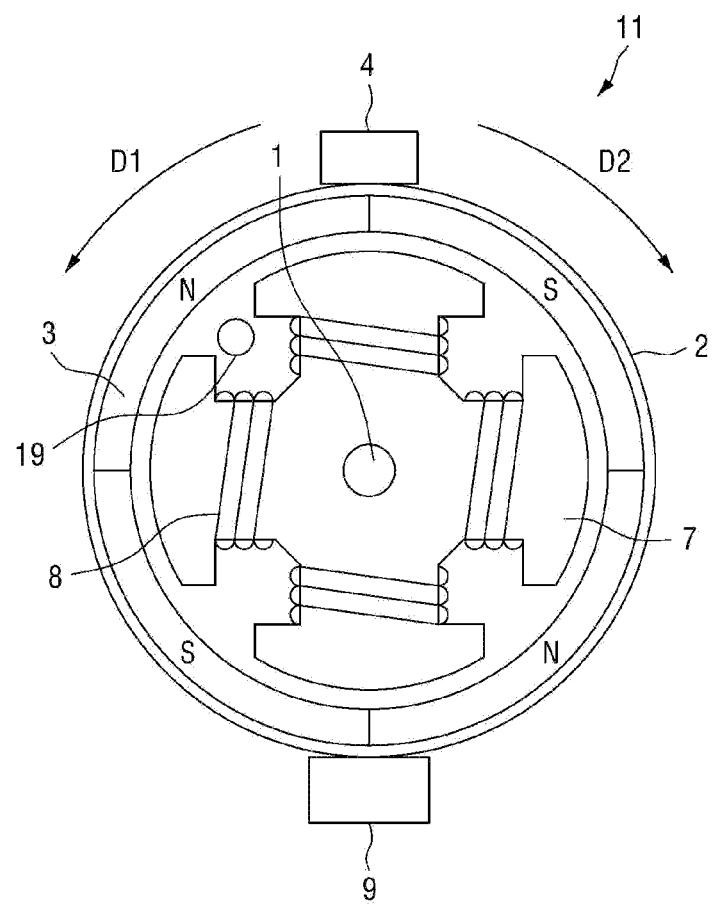
FIG. 9 is a plan view of a haptic element according to another embodiment of the present disclosure.

FIG. 9 is a plan view of a haptic element according to another embodiment of the present disclosure. The protrusion 4 and the stopper 9 have been illustrated conceptually in FIG. 9 for the sake of convenience. Unlike FIG. 9, the positions of the protrusion 4 and the stopper 9 as seen in a plan view can be modified.

Compared to the haptic element 10 described with reference to FIGS. 2 and 3, the haptic element 11 of FIG. 9 can further include a magnetic sensor 19. The magnetic sensor 19 can be a Hall element.

The magnetic sensor 19 can be coupled to the stator part. The magnetic sensor 19 can be separated from but arranged adjacent to the magnet 3. As seen in a plan view, the magnetic sensor 19 can be arranged separated from the stopper 9.

The magnetic sensor 19 can be arranged between adjacent winding cores 7.

The magnetic sensor 19 can sense changes in the magnetic poles of the magnet 3 resulting from the rotation of the rotor part. The magnetic sensor 19 can be provided to determine the rotation angle of the protrusion 4 of the rotor part when the haptic generator device generates a rotational inertia vibration. That is, the protrusion 4 can be made to perform a rotating movement within the range of rotation angles where a collision with the stopper 9 does not occur, based on the magnetic sensor 19.

An example of a method for controlling the rotation angle of the rotor part by using the magnetic sensor 19 is as follows. The magnetic sensor 19 can generate a first signal when adjacent to an N pole of the magnet 3 and can generate a second signal when adjacent to an S pole. The first signal can be any one of a high signal and a low signal, while the second signal can be the remaining other.

Suppose, as in FIG. 9, the protrusion 4 is arranged adjacent to an N pole of the magnet 3, and the magnetic sensor 19 is initially arranged adjacent to an N pole of the magnet 3. At the initial position, the magnetic sensor 19 may generate a first signal. Afterwards, when the rotor part is rotated in the first direction D1 so that the magnetic sensor 19 is adjacent to an S pole of the magnet 3, the magnetic sensor 19 may generate a second signal. If the rotor part continues to rotate in the first direction D1 so that the magnetic sensor 19 is again adjacent to an N pole of the magnet 3, then the protrusion 4 would collide with the stopper 9. Therefore, in order to prevent a collision between the protrusion 4 and the stopper 9, the rotation direction of the rotor part may be changed to rotate in the second direction D2 when the magnetic sensor 19 generates the second signal. The magnetic sensor 19 may be adjacent to the first N pole and may generate the first signal. When the rotor part rotates further in the second direction D2, the magnetic sensor 19 may be adjacent to an S pole and may thus generate a second signal, and the rotation direction of the rotor part can be changed. If the number of poles on the magnet 3 is m, the rotor part can rotate within the rotation angles occupied by as much as (m−1) poles for generating the rotational inertia vibrations. Here, m can be a natural number greater than or equal to 3. In other words, if the magnet 3 has an m number of poles, the rotation direction of the rotor part can be changed whenever there are a maximum of (m−2) signal changes.

Since the poles of a magnet 3 always exist in pairs of N and S poles, the magnet 3 can undergo an oscillating rotational movement within the rotation angles occupied by a minimum of two adjacent poles for generating the rotational inertia vibrations. That is, even in cases where the number of poles is six or more, it is possible for the magnet 3 to undergo an oscillating rotational movement across a minimum of two adjacent N and S poles to generate rotational inertia vibrations.

Referring again to FIGS. 2 to 6, a description is provided on the relationship between the number of poles of the magnet 3 and the number of winding cores 7 having coils 8 wound thereon.

The winding cores 7 on which the coils 8 are wound can be provided in a number k times the number of poles of the magnet 3. Here, k can be a natural number. An embodiment of the present disclosure is illustrated as an example in which the number of poles of the magnet 3 is four, and the number of winding cores 7 on which the coils 8 are wound is also four. By controlling the polarity of the coils 8 wound around the respective winding cores 7 to be the same as or the opposite of the poles of the magnet 3 that the coils are facing, all of the poles of the magnet 3 can be utilized to generate repulsive or attractive forces. Therefore, according to an embodiment of the present disclosure, the numbers of the magnets 3 and the winding cores 7 can be controlled to ensure a fast rotational force and strong halting force for the rotor part.

A haptic generator device 100 according to an embodiment of the present disclosure can generate not only impact vibrations obtained by collisions between the protrusion 4 and the stopper 9 but also rotational inertia vibrations. Moreover, the frequency and type of the rotational inertia vibration can be controlled.

Figure 10:
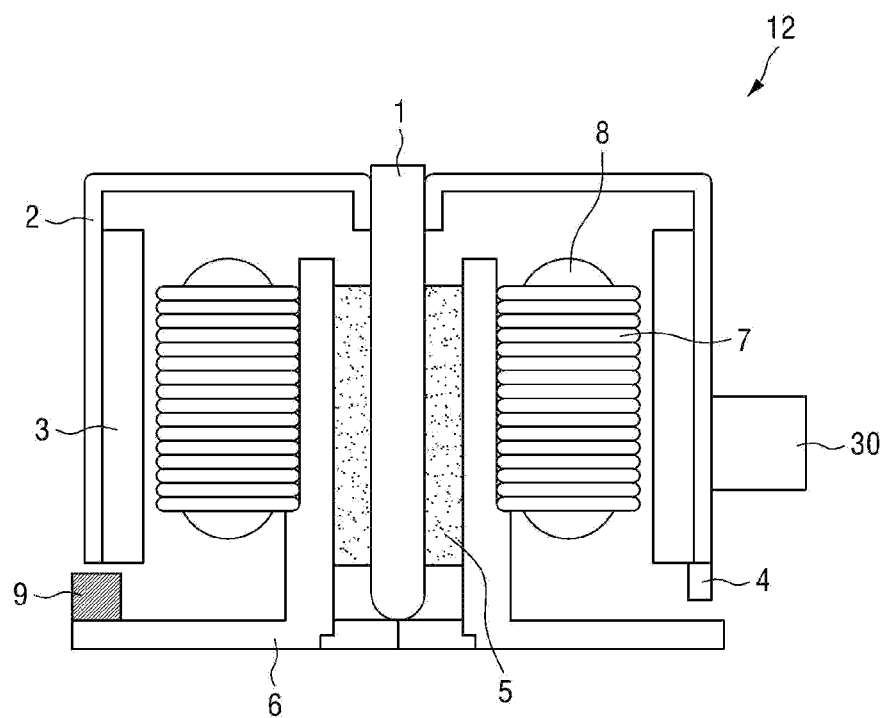
FIG. 10 is a cross-sectional view of a haptic element according to another embodiment of the present disclosure.

FIG. 10 is a cross-sectional view of a haptic element according to another embodiment of the present disclosure.

Compared to the haptic element 10 described with reference to FIGS. 2 and 3, the haptic element 12 described with reference to FIG. 10 can further include an eccentric mass 30.

The eccentric mass 30 can be coupled to the rotor part. More specifically, the eccentric mass 30 can be coupled to at least one of the rotor case 2, magnet 3, rotary shaft 1, and protrusion 4. FIG. 10 illustrates an example in which the eccentric mass 30 is coupled to the rotor case 2.

The eccentric mass 30 can have the effect of increasing the weight of the protrusion and thus can increase the impact vibrations and rotational inertia vibrations.

A haptic generator device based on the present disclosure can be employed in various applied apparatuses.

An applied apparatus can include a gaming apparatus, a gaming controller, a mobile phone, a portable communication device, a multimedia player apparatus, etc.

The applied apparatus may include a haptic generator device according to an embodiment of the present disclosure and a control unit. The control unit can exchange signals with the haptic generator device. The applied apparatus may include a haptic generator device to generate rotational inertia vibrations and impact vibrations and individually control not only the frequency and period but also the intensity of each vibration. Thus, the sense of reality experienced by the user can be maximized.

While certain embodiments of the present disclosure have been described above in more detail with reference to the accompanying drawings, the present disclosure is not necessarily limited to these embodiments and can be practiced in the form of many variations without departing from the technical spirit of the present disclosure.

Thus, the embodiments disclosed herein are not to limit but rather describe the technical spirit of the present disclosure, and the scope of the technical spirit of the present disclosure is not limited by these embodiments. Therefore, the embodiments set forth above must be understood as being illustrative in all aspects and not limiting. The scope of protection of the present disclosure is to be interpreted from the scope of claims below, and all technical concepts set forth in the claims and their scope of equivalents shall be interpreted as being encompassed within the scope of rights of the present disclosure.

INDUSTRIAL APPLICABILITY

There is a high demand for vibration generator devices that provide the user with various haptic feedback. A haptic generator device according to an embodiment of the present disclosure can provide impact vibrations and rotational inertia vibrations that the user with different sensations by using a single haptic element. As a more varied and more realistic haptic feedback can be provided to the user, there is high industrial applicability.

What is claimed is:

1. A haptic generator device comprising:
    a haptic element, the haptic element comprising:
        a stator part having a stopper;
        a rotor part configured to rotate in relation to the stator part, the rotor part having a protrusion;
        a magnet provided on one of the rotor part and the stator part, the magnet having a plurality of poles; and
        a coil provided on the other of the rotor part and the stator part, the coil configured to interact with the magnet to generate a rotational force,
        wherein the rotor part performs an oscillating rotational movement within a 360-degree range,
        while the rotor part rotates in a first direction, a rotational movement of the rotor part is forcibly halted or is rotated in a second direction opposite to the first direction to generate a rotational inertia vibration before the protrusion of the rotor part collides with the stopper of the stator part, and
        when the magnet has an m number of poles, the rotor part rotates within rotation angles occupied by an (m−1) number of poles to generate the rotational inertia vibration, where m is a natural number greater than or equal to 3; and
    a driving signal generator configured to generate a driving signal, the driving signal configured to:
        cause a first electric current to be applied to the haptic element, the first electrical current configured to cause the rotor part to rotate in the first direction; and
        cause a second electric current to be applied to the haptic element, said second electrical current configured to forcibly halt the rotor part or cause the rotor part to rotate in the second direction before the protrusion of the rotor part collides with the stopper of the stator part to generate the rotational inertia vibration.

2. The haptic generator device of claim 1, wherein the haptic generator device is configured to generate an impact vibration different from the rotational inertia vibration, and
    a rotation angle of the rotor part when generating the rotational inertia vibration is smaller than a rotation angle of the rotor part when generating the impact vibration.

3. The haptic generator device of claim 2, wherein the haptic generator device generates the impact vibration by having the protrusion collide with the stopper.

4. The haptic generator device of claim 2, wherein a frequency when generating the rotational inertia vibration is different from a frequency when generating the impact vibration.

5. The haptic generator device of claim 1, wherein, when generating the rotational inertia vibration, an operation of rotating the rotor part in a rotation direction and a braking operation are performed while the rotor part is rotating without changing the rotation direction.

6. The haptic generator device of claim 1, wherein, when generating the rotational inertia vibration, a rotational movement of the rotor part is halted or changed to the second direction before halting at a preset time or longer after the rotor part begins the rotational movement in the first direction.

7. The haptic generator device of claim 1, further comprising an eccentric mass coupled to the rotor part.

8. A haptic generator device comprising:
   a haptic element, the haptic element comprising:
      a stator part having a stopper;
      a rotor part configured to rotate in relation to the stator part, the rotor part having a protrusion;
      a magnet provided on one of the rotor part and the stator part, the magnet having a plurality of poles; and
      a coil provided on the other of the rotor part and the stator part, the coil configured to interact with the magnet to generate a rotational force,
      wherein the rotor part performs an oscillating rotational movement within a 360-degree range,
      while the rotor part rotates in a first direction, a rotational movement of the rotor part is forcibly halted or is rotated in a second direction opposite to the first direction to generate a rotational inertia vibration before the protrusion of the rotor part collides with the stopper of the stator part;
      the rotor part is configured to generate an impact vibration and a rotational inertia vibration different from each other while rotating within a particular rotation angle range,
      when the magnet has an m number of poles, the rotor part rotates within rotation angles occupied by an (m−1) number of poles to generate the rotational inertia vibration, where m is a natural number greater than or equal to 3, and
      when generating the rotational inertia vibration, the rotor part undergoes an oscillating rotational movement within rotation angles occupied by two adjacent poles and undergoes an oscillating rotational movement across an N pole and an S pole adjacent to each other; and
   a driving signal generator configured to generate a driving signal, the driving signal configured to:
      cause a first electric current to be applied to the haptic element, the first electrical current configured to cause the rotor part to rotate in the first direction; and
      cause a second electric current to be applied to the haptic element, said second electrical current configured to forcibly halt the rotor part or cause the rotor part to rotate in the second direction before the protrusion of the rotor part collides with the stopper of the stator part to generate the rotational inertia vibration.

9. The haptic generator device of claim 8, wherein the impact vibration and the rotational inertia vibration are generated alternately.

10. The haptic generator device of claim 8, wherein the rotor part rotates in a particular direction to generate the impact vibration and rotates in an opposite direction of the particular direction to generate the rotational inertia vibration.

11. The haptic generator device of claim 8, wherein the impact vibration and the rotational inertia vibration are operated in a same frequency.

12. An applied apparatus comprising:
   a haptic element comprising:
      a stator part having a stopper;
      a rotor part configured to rotate in relation to the stator part, the rotor part having a protrusion;
      a magnet provided on one of the rotor part and the stator part, the magnet having a plurality of poles; and
      a coil provided on the other of the rotor part and the stator part, the coil configured to interact with the magnet to generate a rotational force,
      the rotor part performs an oscillating rotational movement within a 360-degree range,
      while the rotor part rotates in a first direction, a rotational movement of the rotor part is forcibly halted or is rotated in a second direction opposite to the first direction to generate a rotational inertia vibration before the protrusion of the rotor part collides with the stopper of the stator part, and
      when the magnet has an m number of poles, the rotor part rotates within rotation angles occupied by an (m−1) number of poles to generate the rotational inertia vibration, where m is a natural number greater than or equal to 3;
   a driving circuit configured to provide an electric current to the haptic element; and
   a driving signal generator configured to generate a driving signal, the driving signal configured to:
      cause the driving circuit to apply a first current to the haptic element to cause the rotor part to rotate in the first direction; and
      before the protrusion of the rotor part collides with the stopper of the stator part, cause the driving circuit to apply a second current to the haptic element to cause the rotor part to forcibly halt or rotate the rotor in the second direction to generate the rotational inertia vibration.

\* \* \* \* \*